(No Model.)
A. WICKEY.
BALE WEIGHING ATTACHMENT FOR BALING PRESSES.
No. 370,171. Patented Sept. 20, 1887.
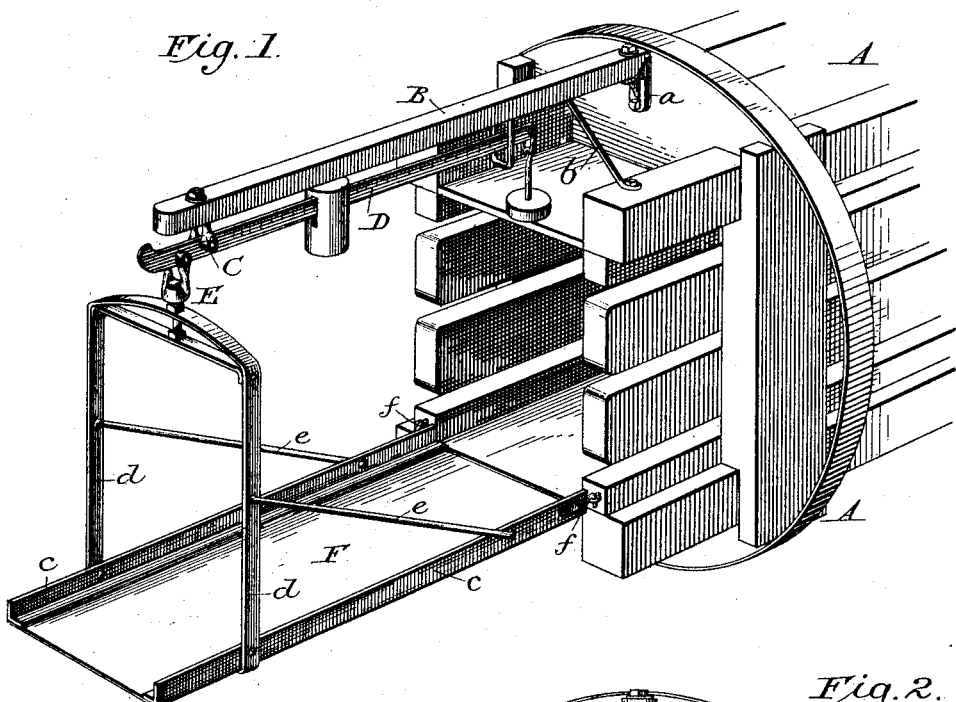
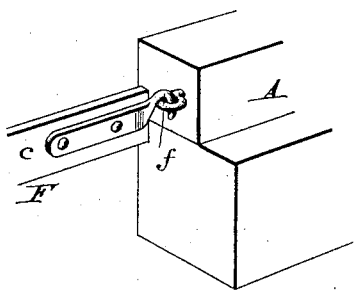
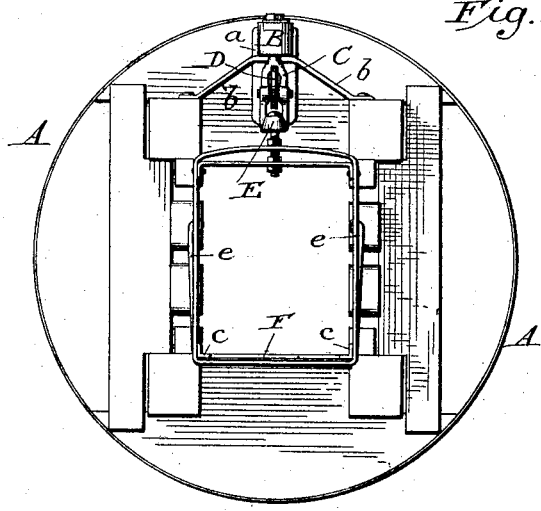
Attest
Sidney P. Hollingsworth
N. R. Kennedy
Inventor
Andrew Wickey
By his Atty
Phil. T. Dodge.

UNITED STATES PATENT OFFICE.

ANDREW WICKEY, OF QUINCY, ILLINOIS.

BALE-WEIGHING ATTACHMENT FOR BALING-PRESSES.

SPECIFICATION forming part of Letters Patent No. 370,171, dated September 20, 1887.

Application filed December 4, 1886. Serial No. 220,668. (No model.)

*To all whom it may concern:*

Be it known that I, ANDREW WICKEY, of Quincy, in the county of Adams and State of Illinois, have invented certain Improvements in Bale-Weighing Attachments for Baling-Presses, of which the following is a specification.

At the present day there is in general use a class of hay-baling machines commonly known as "continuous presses," in which the bales of hay are delivered one after another horizontally from the end of a trunk or chamber. As the bales vary somewhat in weight, it is necessary that they should be weighed to determine their value. This operation, as usually practiced, requires a special handling of the bales after they are delivered from the press, and involves considerable labor and expense.

The aim of my invention is to provide for the rapid and ready weighing of the bales without the necessity of rehandling them as they are delivered from the press; and to this end it consists, essentially, in the combination, with the delivery end of the press, of scales arranged to receive the bales therefrom, determine their weight, and permit their convenient discharge without stopping the action of the machine and without permitting interference between the successive bales.

In the accompanying drawings, Figure 1 is a perspective view representing the delivery end of a baling-press provided with my improvements. Fig. 2 is an end elevation showing the manner in which the scales are sustained. Fig. 3 is a detail view showing one form of the coupling or connection which may be used to retain the platform or receiving scales in position during the delivery of the bale thereto.

Referring to the drawings, A represents the frame or trunk of the press, in which the bales are formed and from which they are delivered one after another in a horizontal direction. The details of this press may be such as are represented in my application for Letters Patent No. 196,004, dated February 6, 1886, or of any other suitable construction. As these details are familiar to persons skilled in the art and constitute no part of the present invention, it is deemed unnecessary to describe them herein.

In applying my present improvement I fix firmly to the rear end of the machine in any suitable manner, preferably by a bracket, a, and braces b, as shown, an overhead arm, B, which extends beyond the end of the press in the direction in which the bales are discharged. From the rear end of this arm I suspend by a pivoted connection, C, a scale-beam, D. This scale-beam, which may be of ordinary construction and provided with the usual sliding weight, vibrates at its free end in suitable guides attached to the support B, whereby it is kept in position thereunder and prevented from swinging horizontally. From the rear or outer end of the scale-beam I suspend by a swiveling connection, E, a frame or platform, F, of suitable form to receive and support the bales as they are delivered from the press. I prefer, as shown in the drawings, to suspend this frame or platform wholly at its outer end at a suitable distance from the end of the press, and to construct it, as shown, of two longitudinal bars, c, of angular form in cross-section, sustained by uprights d and braces e.

At the forward or inner end I provide the platform F with hooks f, or equivalent coupling devices, which may be engaged with corresponding parts on the delivery end of the press at its lower side. When it is coupled to the press, the platform stands in such position that the outcoming bales will be forced directly thereon and sustained thereby. As soon as the bale is in position the hooks are detached and the platform swung horizontally, the effect of which is to throw the entire weight of the bale upon the scale-beam, so that the weight may be quickly determined thereby, and at the same time to throw the completed bale out of the path of the end of the next succeeding bale, which immediately follows it from the press. The weight of the first bale being determined, it is tipped from the platform and the latter immediately turned to its original position and reconnected with the press to receive the second bale.

It will be observed that the suspension of the platform from one end is advantageous, in that it prevents interference between the bales, and that it allows the bales to be delivered by tipping or tilting the platform, this operation requiring but slight effort on the part of the attendant.

It is obvious that the swivel could be located at the point C and the entire scale arranged to swing horizontally with the bale; but the construction represented in the drawings is for many reasons preferred.

It will be manifest to the skilled mechanic that the details of construction may be variously modified without changing essentially the mode of action.

In order to prevent the corner of the platform F from encountering the end of the press in such manner as to prevent the horizontal turning motion, it is only necessary that the inner end should be slightly depressed to clear the press. Owing to the fact that the point of suspension is nearer the outer than the inner end of the platform, this falling motion will occur by gravity. The horizontal motion may also be permitted by giving sufficient flexibility to the suspending device E, that it may yield slightly and permit the corner of the platform to slide across the end of the press.

I do not claim, broadly, a scale-platform suspended by a swiveling joint; nor do I claim, regardless of its location and arrangement, the scale in connection with a baling-press; but I believe myself to be the first to locate a scale-platform in position to receive the bales automatically from a horizontal-delivery press, and the first to provide in this connection means for permitting the platform to be connected and disconnected from the press at will.

Having thus described my invention, what I claim is—

1. In combination with the trunk of a baling-press from which the bales are delivered horizontally, a scale having a horizontal platform arranged at the delivery end of said trunk in position to receive the outgoing bales, and suspending devices, substantially as shown, which permit said platform to be turned horizontally.

2. In combination with the trunk of a baling-press from which the bales are delivered horizontally, a scale having its platform located adjacent to the end of the trunk in position to receive the bales, suspending devices adapted to permit the horizontal rotation of said platform, and means, substantially as described, whereby the platform may be connected to and disconnected from the trunk at will.

3. In combination with the trunk A of a baling-press from which the bales are delivered horizontally, the overhanging arm B, the scale having its platform suspended near one end by a swiveling connection from said arm, and devices $f$, whereby the end of the platform may be connected to the trunk at will and sustained in position to receive the outgoing bales.

In testimony whereof I hereunto set my hand, this 23d day of October, 1886, in the presence of two attesting witnesses.

ANDREW WICKEY.

Witnesses:
GEORGE W. FOGG,
GEORGE C. McCRONE.